United States Patent
Kosaka et al.

[11] Patent Number: 5,608,618
[45] Date of Patent: Mar. 4, 1997

[54] METHOD OF MANUALLY FEEDING COORDINATE SYSTEM AND ROBOT CONTROL DEVICE

[75] Inventors: Tetsuya Kosaka; Seigou Katou, both of Minamitsuru-gun, Japan

[73] Assignee: Fanuc Limited, Yamanashi, Japan

[21] Appl. No.: 397,471

[22] Filed: Mar. 2, 1995

[30]    Foreign Application Priority Data

Mar. 8, 1994  [JP]  Japan .................................. 6-062131

[51] Int. Cl.⁶ .................................................. G05B 19/18
[52] U.S. Cl. ................................. 364/167.01; 318/568.19
[58] Field of Search ........................ 364/167.01; 318/572, 318/573, 568.11, 568.1, 568.12, 568.13, 568.14, 568.15, 568.16, 568.17, 568.18, 568.19; 395/86, 88

[56]           References Cited

U.S. PATENT DOCUMENTS

| | | | |
|---|---|---|---|
| 4,166,543 | 9/1979 | Dahlstrom | 395/88 |
| 4,511,985 | 4/1985 | Inaba et al. | 395/86 |
| 4,626,756 | 12/1986 | Inaba et al. | 318/573 |
| 4,771,222 | 9/1988 | Nakashima et al. | 318/572 |

*Primary Examiner*—Roy N. Envall, Jr.
*Assistant Examiner*—Karen D. Presley
*Attorney, Agent, or Firm*—Staas & Halsey

[57]           ABSTRACT

A jog-feed operation is set to enable rotation and movement of a coordinate system. During the jog-feed of the coordinate system, a robot is moved equivalently to the jog-feed steps. A tool distal end point of the robot is initially moved to the origin of a user coordinate system serving as a moving target. A jog-feed mode is set to a coordinate system jog-feed mode in conformity to the coordinate system itself. A translating jog-feed operation is carried out until the tool distal end point of the robot reaches a vertex of a workpiece. The tool distal end point of the robot is subsequently moved to a point on an axis of the coordinate system. A rotational jog-feed operation is carried out until the tool distal end point of the robot reaches an edge line of the workpiece. According to the above jog-feed operation, a robot control device calculates an amount of movement of the coordinate system.

4 Claims, 5 Drawing Sheets

METHOD OF MANUALLY FEEDING COORDINATE SYSTEM AND ROBOT CONTROL DEVICE

BACKGROUND OF THE INVENTION

1. Field of the Invention

This invention relates to a method of manually feeding a coordinate system on which an operation of an industrial robot (hereinafter briefly referred to as robot) is based, and to a robot control device. More particularly, the present invention relates to a method of manually feeding a position of the origin or an attitude of a preset user coordinate system in accordance with user's requirements, and to a robot control device including a modifying function which is carried out by manually feeding the user coordinate system.

2. Description of the Related Art

Various types of coordinate systems are typically set in a robot control device to control a robot, and can be classified into the following two general categories.

A) Coordinate systems inherent in the robot

The coordinate systems can not basically be modified by a user, and include the following coordinate systems:

a1) World coordinate system defined on the basis of a position which is not varied depending upon an attitude of the robot, and a2) Face plate coordinate system set on a face plate surface of an arm distal end forming a mechanical interface of the robot.

B) Coordinate systems set by the user with reference to the robot

The coordinate systems include the following coordinate systems:

b1) User coordinate system set on the basis of the world coordinate system so as to provide at least one of constant translation and constant rotation on the world coordinate system, and a typical user coordinate system being referred to as work coordinate system which is set, for example, on a workpiece so as to establish particular relationships with a position or an attitude of the workpiece as an object of robot working, and b2) Tool coordinate system set on the basis of the face plate coordinate system to show a relative position and a relative attitude (translation and rotation) of a tool distal end point, and the tool distal end point being recognized depending upon the coordinate system during control of the robot.

In these coordinate systems, the user coordinate system, in particular, the work coordinate system is essential to perform a smooth robot operation, and setting accuracy thereof serves as an important factor to affect accuracy of the robot operation. The work coordinate system is typically set and used when, for example, the robot should be operated along a specific line corresponding to an edge or the like of a workpiece. Therefore, it is necessary to set the work coordinate system so as to meet conditions in which, for example, the line agrees with one of the coordinate axes, and the origin agrees with a specific position of the workpiece. Further, when importance is given to the attitude of the robot with respect to the workpiece, a specific relationship is required regarding the attitude of the work coordinate system with respect to the workpiece (for example, a relationship in which three orthogonal edge lines of the workpiece respectively agree with an X axis, a Y axis, and a Z axis of the work coordinate system).

However, it is extremely hard to set the work coordinate system by only one setting operation so as to meet the above conditions. That is, in a general setting operation, a coordinate system that agrees with the desired coordinate system as close as possible can be set by repeating coordinate system setting operations and subsequent observations of the locus of robot movement conforming to the set coordinate system (for example, the locus of movement along the X, Y, and Z axes), many times on the trial-and-error basis.

Further, after the work coordinate system has been correctly set once, a mounting position of the workpiece as machining target is frequently modified and finely controlled. Consequently, the work coordinate system should be modified for each modification or fine control. In the prior art, there is only one way to modify the work coordinate system (i.e., the user coordinate system in general) by resetting of the coordinate system. The resetting operation of the coordinate system is carried out by directly inputting calculated values, imaged values, or measured values about coordinates in a space obtained by moving and/or rotating the world coordinate system by a certain amount, or by teaching a point on an axis (for example, an X axial direction) of the coordinate system, instead of inputting a value as in the case of other values to be inputted.

As set forth above, in the conventional modification of the user coordinate system by the resetting operation, other preset coordinate systems are not effectively utilized, resulting in high loss in view of both an operation time and the accuracy. In addition, since no coordinate system exists in a visible form in a space, it is extremely difficult to set a new coordinate system while holding an image of the coordinate system before the modification.

Even if the image can be obtained, a highly skilled operator is required to accurately and rapidly carry out specific operation according to the image (for example, a corrective operation in which the original coordinate system is moved by a certain distance L in the X axial direction, and is rotated about the Y axis in a normal direction by a certain angle $\phi$), in order to set a user coordinate system which is actually fit for the purpose.

SUMMARY OF THE INVENTION

In order to overcome the above problems, it is an object of the present invention to provide a method of manually feeding an original user coordinate system and a robot control device having a coordinate system manual-feed function, so as to enable rapid and accurate corrective setting of the coordinate system.

A description will now be given of manual-feed of the coordinate system according to the present invention.

In general, a robot control device has a jog-feed function to gradually change a position or a posture of a robot by manual operation. In the jog-feed, the robot is typically translated along specified coordinate axes (specified by, for example, an X axis, a Y axis, and a Z axis, or by a first axis, a second axis, and a third axis) of a specified coordinate system in a specified direction (in a positive or negative direction). Alternatively, the robot is typically rotated about the specified coordinate axis of the specified coordinate system in a specified direction (in a positive or negative direction of W, P, and R).

An operator controls a keyboard mounted on a teaching control panel of the robot control device to set the robot control device to a jog-feed mode. In this state, the operator selectively depresses jog keys shown by, for example, X+, X−, Y+, Y−, Z+, Z−, α+, α−, β+, β−, γ+, and γ− after specifying a reference coordinate system (such as world coordinate system, and user coordinate system), thereby starting the translation or the rotation of the robot according to the pressed key. It is possible to adjust an amount of the translation or the rotation by a depressing time period of the jog key or the number of times of repeated depression thereof.

The present invention is made to use, even in the user coordinate system, a function similar to a manual operation function to move the robot.

According to the present invention, when the user coordinate system is set or finely controlled, the translation and the rotation of the coordinate system itself can be realized by jog-feed operation. Thus, the operator can extremely easily find the optimal coordinate system setting state, and it is possible to reduce a time required for modification of the user coordinate system and to improve setting accuracy.

In a method of the present invention, one user coordinate system is selected as a manual operation target to be jog-fed on a reference coordinate system. During the operation, the robot is moved equivalently to jog-feed steps. In other words, the robot during the jog-feed is held stationary as seen on the user coordinate system.

That is, while the user coordinate system is successively jog-fed, control is made to keep a constant position and a constant posture of the robot on the user coordinate system so as to move the robot equivalently to the jog-feed steps.

This can realize the movement (i.e., the translation and the rotation) of the robot equivalent to the jog-feed steps of the user coordinate system, thereby visually showing originally invisible movement of the user coordinate system by observing the movement of the robot. It is also possible to optionally select a stationary position (i.e., the position and the posture of the robot when the jog-feed of the coordinate system is started) of the robot on the user coordinate system. This is extremely effective in finding the optimal user coordinate system.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
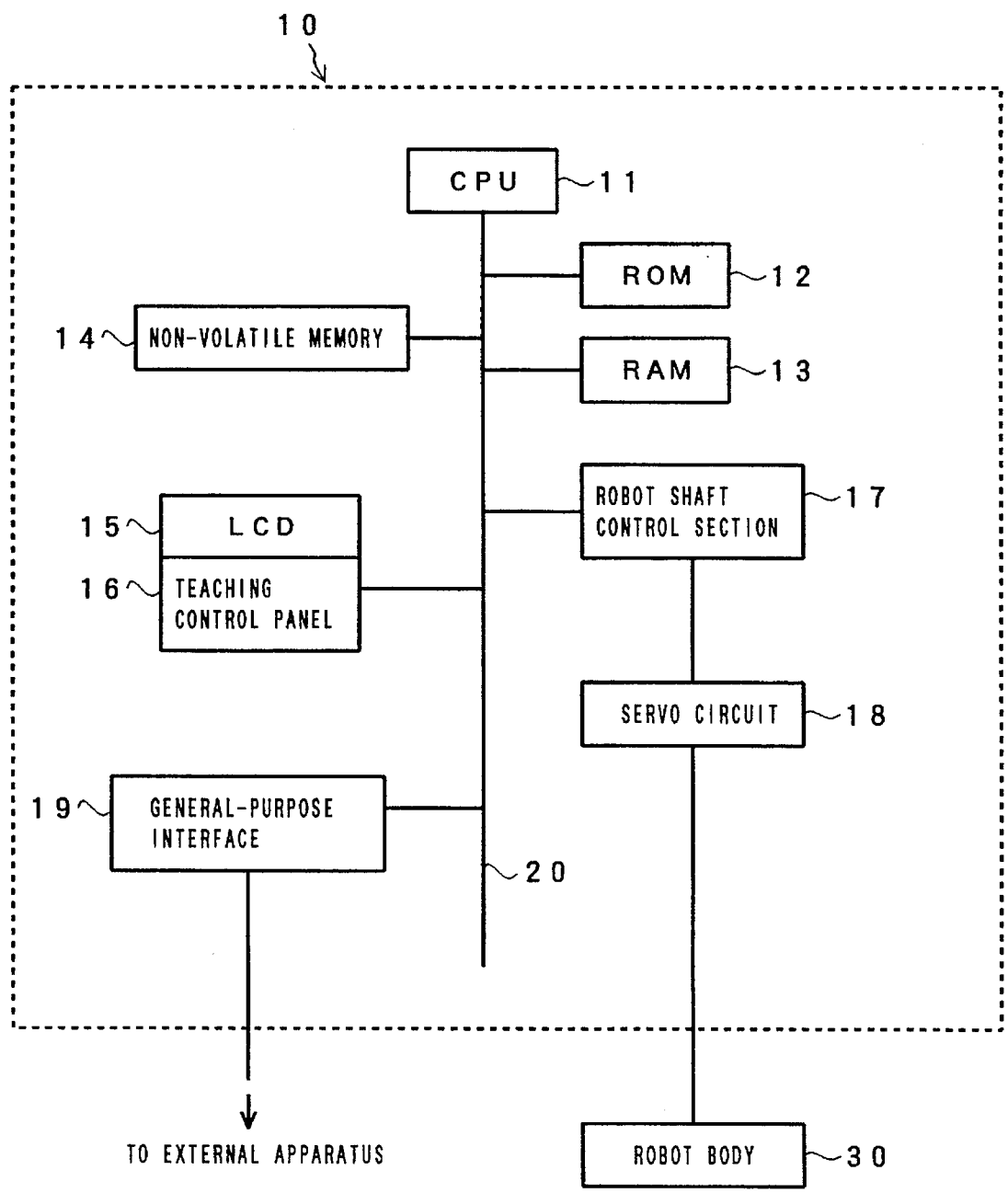
FIG. 1 is a block diagram showing an essential part of a structure of a robot control device according to the present invention.

FIG. 1 is a block diagram showing an essential part of a structure of a robot control device according to the present invention.

In the drawing, a robot control device 10 has a central processing unit (hereinafter referred to as CPU) 11, and the CPU 11 is connected through a bus 20 to a memory 12 including a ROM, a memory 13 including a RAM, a non-volatile memory 14 including a CMOS device and so forth, a teaching control panel 16 including an LCD (a liquid crystal display) 15, a robot axis control section 17 to control each axis in the robot, and a general-purpose signal interface 19.

The robot axis control section 17 is connected through a servo circuit 18 to a robot body 30, and an external apparatus such as an off-line programming apparatus is appropriately connected to the general-purpose interface 19.

A program is stored in the ROM memory 12 to supervise and control the entire robot control device. The non-volatile memory 14 contains an operation program and associated data for the robot, definition data of a world coordinate system, and data of a user coordinate system set by a user.

Though the above-mentioned structure and function are basically identical with those in a conventional robot control device, the robot control device in the embodiment has an additional function. That is, an operator controls keys of the teaching control panel 16 while seeing a display of the attached LCD 15 to select a mode in which the robot control device can be operated in a coordinate system jog-feed mode, and manual input can provide desired jog-feed of a specified user coordinate system. Further, when it is decided that the user coordinate system is manually fed and shifted to the optimal state, another manual input can be received to fix the user coordinate system.

Figure 4:
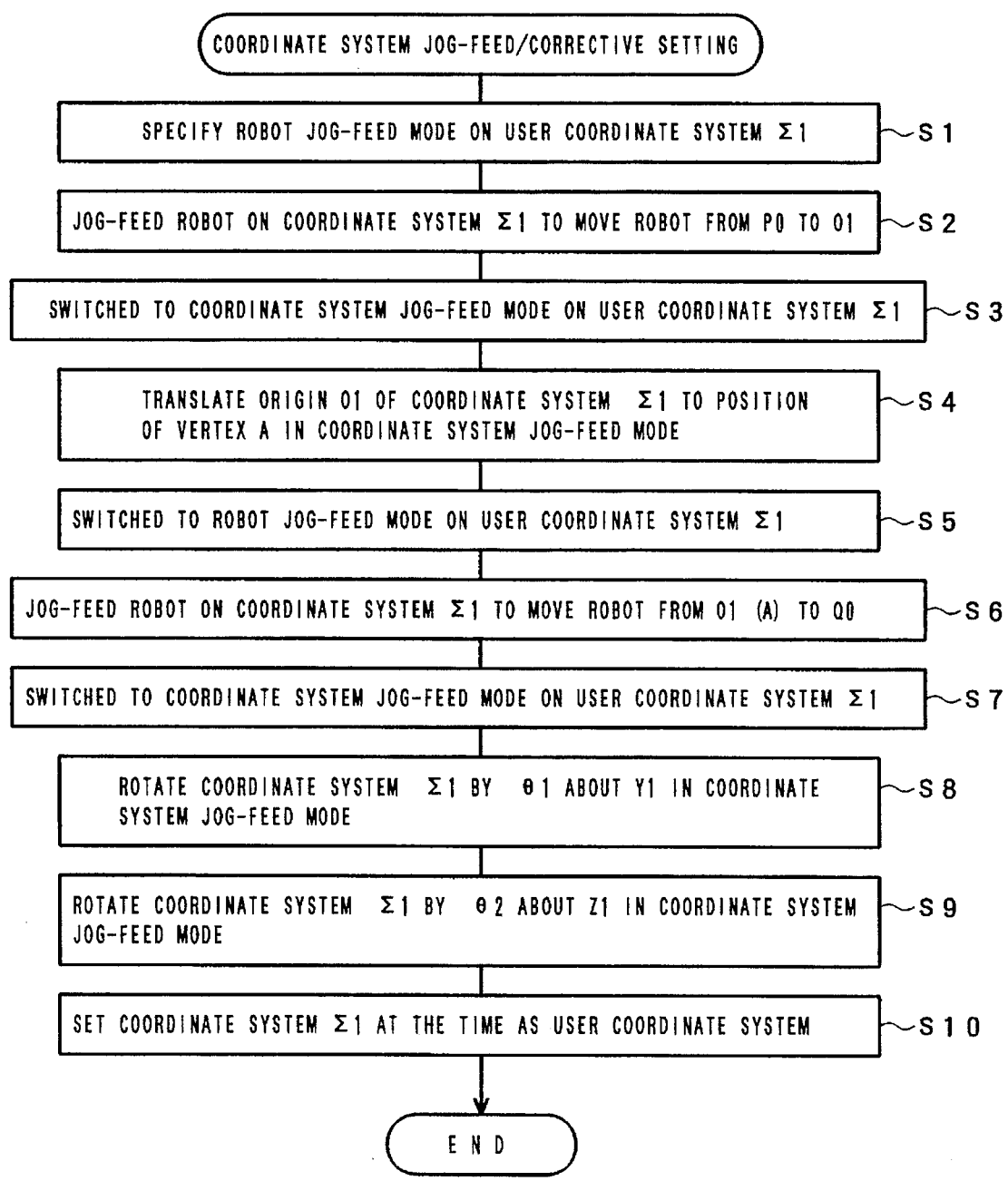
FIG. 4 is a flowchart illustrating procedure of a coordinate jog-feed/corrective setting operation starting from the state shown in FIG. 2.

Then, corresponding to the input functions of the teaching control panel 16, the non-volatile memory 14 contains a coordinate system jog-feed/corrective setting program (see the following description about a flowchart of FIG. 4) and the associated data, thereby causing the robot control device to perform a coordinate system jog-feed operation and a coordinate system corrective setting operation as will be described infra with reference to specific embodiments.

Figure 2:
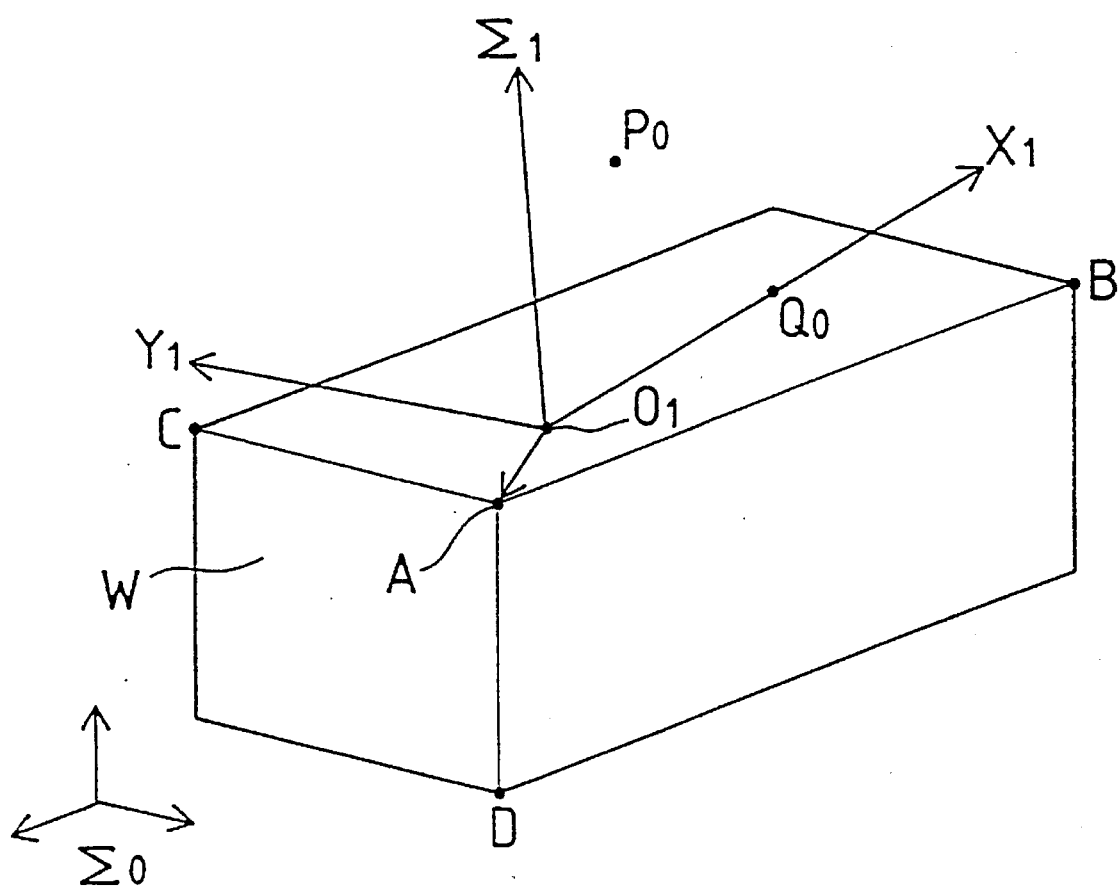
FIG. 2 is a diagram showing a relationship between a user coordinate system $\Sigma_1$ before modification and a workpiece W in the embodiment.
Figure 3:
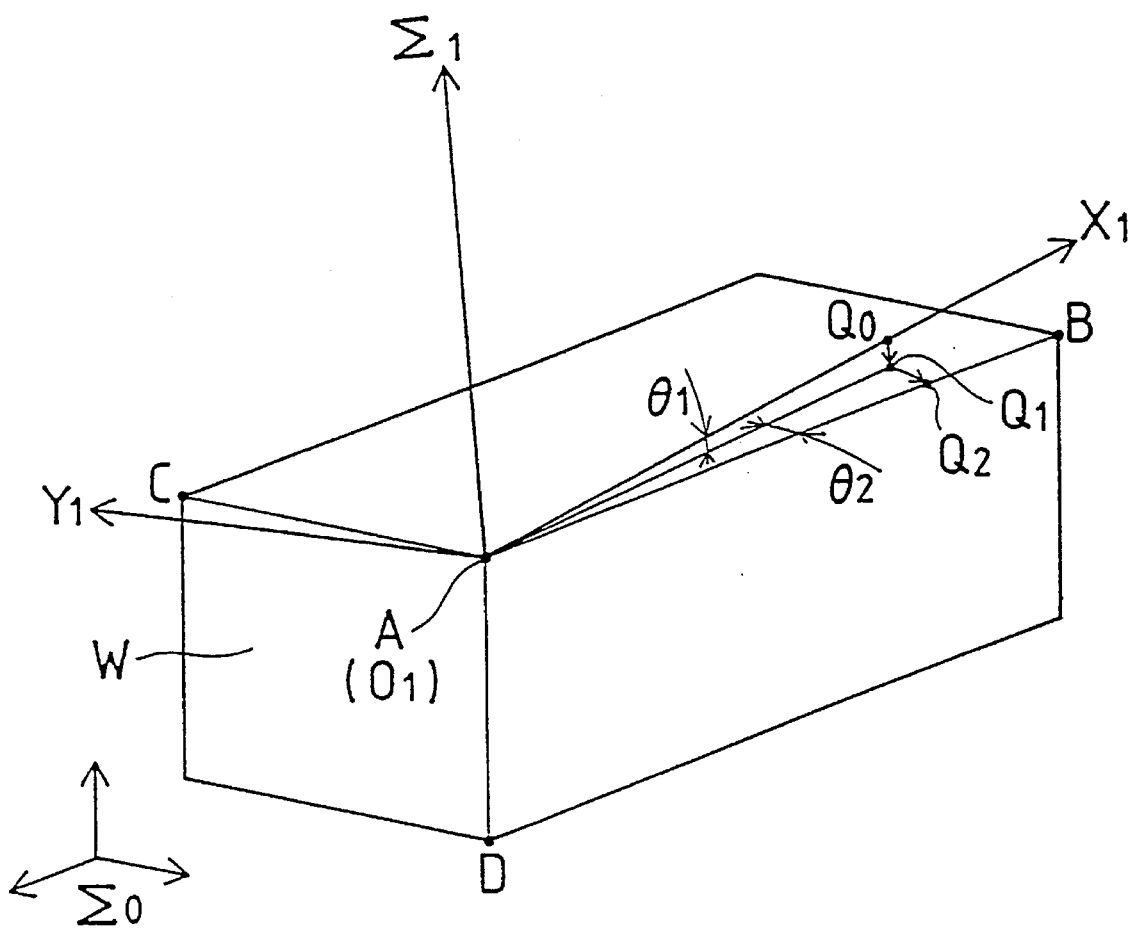
FIG. 3 is a diagram illustrating procedure and processing of jog-feeding the user coordinate system $\Sigma_1$ starting from a state shown in FIG. 2.

Here, it is assumed that a world coordinate system is defined as $\Sigma_0$, and four user coordinate systems $\Sigma_1$ to $\Sigma_4$ have been set. The coordinate system jog-feed/corrective setting program is started to jog-feed the user coordinate system $\Sigma_1$ under conditions as shown in FIGS. 2 and 3. Subsequently, a description will be given of a case in which the manually fed user coordinate system $\Sigma_1$ is fixed in an optional state (see FIG. 3) for corrective setting.

In FIG. 2, reference numeral W means a workpiece having a rectangular parallelepiped form, and the user coordinate system $\Sigma_1$ is set as a work coordinate system in relation to the workpiece W. The user coordinate system $\Sigma_1$ serving as the work coordinate system is set so as to provide a state in which the origin $O_1$ can agree with a vertex A, and an $X_1$ axis and a $Y_1$ axis can respectively agree with edge lines AB and AC (accordingly a $\Sigma_1$ axis naturally agreeing with an edge line DA). As shown in the drawing, the origin is offset by a small distance, and the $X_1$, $Y_1$, and $\Sigma_1$ axes are inclined by small angles with respect to edge lines AB, AC, and DA. Further, the robot is waiting with a tool (whose distal end point matching the origin of a tool coordinate system) mounted at a position $P_0$ sufficiently apart from the workpiece W.

In the following discussion, the above state is supposed as an initial condition. A description will now be given of procedure of the coordinate system jog-feed/corrective setting operation, and steps of the coordinate system jog-feed/corrective setting program in the procedure with reference to flowcharts of FIGS. 4 and 5.

Initially, control is made to a mode specifying key, a coordinate system specifying key and so forth on the teaching control panel 16 so as to specify a robot jog-feed mode on the user coordinate system $\Sigma_1$ (Step S1). The robot is thereby moved from the position $P_0$ to $O_1$ by the jog-feed (Step S2). Since the robot is jog-fed as in the prior art, a detailed description thereof is omitted.

Next, additional control is made to the mode specifying key mounted on the teaching control panel 16 for switching to the coordinate system jog-feed mode. As a reference coordinate system, it is possible to specify any one of the preset coordinate systems including the world coordinate system $\Sigma_0$, other user coordinate systems $\Sigma_2$ to $\Sigma_4$, the tool coordinate system $\Sigma_t$, a face plate coordinate system $\Sigma_f$, and so forth. Here, in view of facilitation of operator's control in the embodiment, the user coordinate system $\Sigma_1$ itself serving as a jog-feed target is specified as the reference coordinate system (Step S3). Jog-feed keys X+, X−, Y+, Y−, Z+, and Z− (for translation), α+, α−, β+, β−, γ+, and γ− (for rotation) are mounted on the teaching control panel 16, and these keys can serve as not robot jog-feed keys but manual input keys to jog-feed the user coordinate system $\Sigma_1$, in conformity to the user coordinate system itself.

The robot control device stores a matrix (S1) as position data which shows a position and an attitude of the user coordinate system $\Sigma_1$ at a starting time of coordinate system jog-feed on the world coordinate system $\Sigma_0$. At this time point, the robot is positioned at the origin of the user coordinate system $\Sigma_1$.

From this state, the origin of the coordinate system $\Sigma_1$ is caused to agree with a position of the vertex A by appropriately combining and carrying out translating jog-feed operations of the user coordinate system $\Sigma_1$ in the respective $X_1$, $Y_1$, and $Z_1$ axial directions (Step S4). During the operation, (the tool distal end point of) the robot is held at a position of the origin of the user coordinate system $\Sigma_1$. Thus, while grasping movement of the user coordinate system $\Sigma_1$ by the movement of the robot, the operator may jog-feed the robot to the vertex A by appropriately specifying the translation keys X+, X−, Y+, Y−, Z+, and Z− mounted on the teaching control panel 16.

Figure 5:
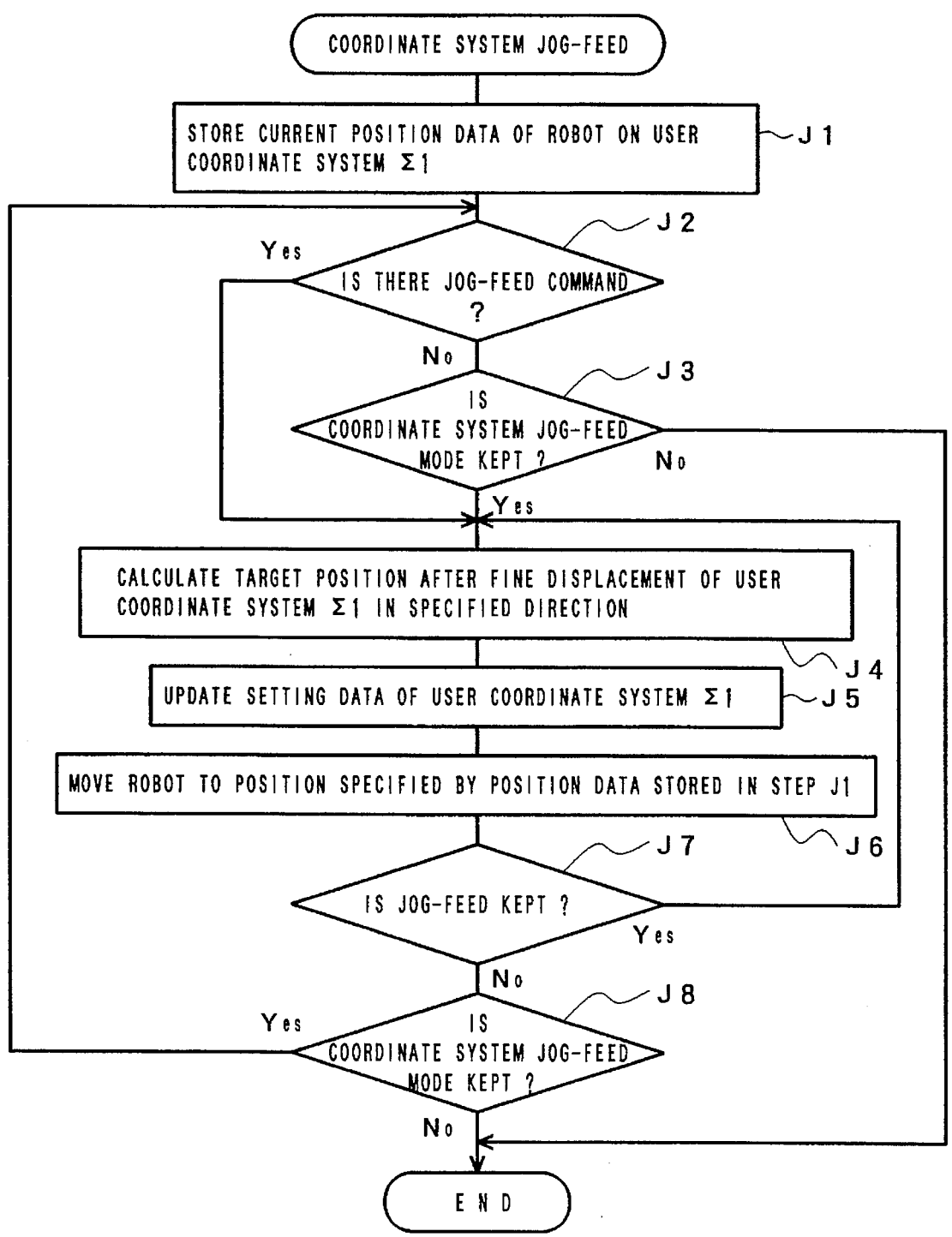
FIG. 5 is a flowchart illustrating the steps of a coordinate system jog-feed/corrective setting program in the procedure shown in FIG. 4.

During the operation, the coordinate system $\Sigma_1$ is jog-fed and the robot is moved according to the steps in the flowchart of FIG. 5.

The robot control device 10 is set to the coordinate system jog-feed mode to initially store robot position data (on the user coordinate system $\Sigma_1$) at the time point (Step J1). Here, a position of the origin and a posture are stored, and the robot control device 10 is subsequently in a state to wait operator's jog key input (Step J2). Concurrently, it is periodically checked whether or not the coordinate system jog-feed mode is to be continued (Step J3). If it is confirmed in Step J3 that the coordinate system jog-feed mode is terminated, the process is ended.

When the operator depresses the jog-feed key to move the user coordinate system $\Sigma_1$ in a certain direction (for example, in the $X_1$ axial direction), the process proceeds from Step J2 to Step J4.

The jog-feed is carried out by repeating a preset fine displacement. Consequently, in Step J4, a moving target position and a target posture of the user coordinate system $\Sigma_1$ for the first fine displacement are calculated. A matrix showing the position and the posture of the user coordinate system $\Sigma_1$ before the displacement is defined as (S), and another matrix (hereinafter referred to as fine displacement matrix) is defined as (Δ) to show a relative position and a relative attitude as viewed the coordinate system $\Sigma_1$ after the displacement from the coordinate system $\Sigma_1$ before the fine displacement. Accordingly, the moving (jog-feeding) target position of the user coordinate system $\Sigma_1$ can be expressed as (Δ)·(S). Data defining (Δ) can be found by a displacement direction specified by the jog-feed direction specifying keys (X+, Z−, and so forth) and a predetermined amount of fine displacement. In subsequent Step J5, setting data of the user coordinate system $E_1$ are updated depending upon the result of calculation in Step J4.

Upon the updated (i.e., finely jog-fed) user coordinate system $Z_1$, a current position of the robot is different from the position data stored in Step J1 by the amount of the fine displacement of the user coordinate system. Hence, in Step J6, in order to compensate for the deviation of the robot position data, the position data stored in Step J1 is read out, and the robot is moved to a target point on the (updated) user coordinate system $\Sigma_1$, which is specified by the position data.

The above processing cycle is finished, resulting in completion of a single process for the fine displacement. In subsequent Step J7, it is assured whether or not the jog-feed is continued. If Yes (for example, in case the same jog-feed key is kept depressed), the process returns to Step J4, and the process from Step J4 to Step J7 is repeated once again. Since a second or later process is identical with the first process, a detailed description thereof is omitted.

When it is decided that the user coordinate system $\Sigma_1$ has been jog-fed by the repeated fine displacement in a specified direction by a desired amount, the operator, for example, stops depressing the jog-feed key. Thus, decision of NO is made in Step J7, and the process proceeds to Step J8. If the coordinate system jog-feed mode is continued, the process returns to Step J2 to wait a command to start the next coordinate system jog-feed or stop the coordinate system jog-feed mode. When it is confirmed in step J2 that the coordinate system feed is started, the same process is repeated from Step J4 once again.

When an operator cause the origin $O_1$ to agree with the vertex A by jog-feeding the user coordinate system $\Sigma_1$ while observing the position of the robot holding the position of the origin $O_1$ on the user coordinate system $\Sigma_1$, a state of the user coordinate system $\Sigma_1$ as shown in FIG. 3 is realized (i.e., completion of Step S4). However, in this state, though the position of the origin of the user coordinate system $\Sigma_1$ agrees with the position of the vertex A as the operator plans, the respective $X_1$, $Y_1$, and $Z_1$ axes do not agree with the edge lines AB, AC, and DA. Accordingly, such a state cannot be sufficient.

In Step S5, the robot control device 10 is switched over to the robot jog-feed mode, and the user coordinate system $\Sigma_1$ is employed as the reference coordinate system. Further, the robot is jog-fed and moved along the $X_1$ axis to reach a fixed point $Q_0$ (see FIG. 3) on the $X_1$ axis, which is apart from the origin $O_1$ by an appropriately set distance (Step S6).

Subsequently, the robot control device 10 is switched over to the coordinate system jog-feed mode in Step 7. As shown in FIG. 3, the user coordinate system $\Sigma_1$ is rotated and jog-fed about the $Y_1$ axis to conform the position of the robot to a point $Q_1$ on the workpiece W (Step S8). During the operation, an amount $\theta_1$ of rotation of (the tool distal end point of) the robot about the $Y_1$ axis is identical with an amount of the rotary jog-feed of the $X_1$ axis.

In such a manner, the coordinate system is jog-fed and the robot is moved according to the steps in the flowchart of FIG. 5 with slightly modified conditions.

That is, the robot position data (on the user coordinate system $\Sigma_1$) at the time point is stored in Step J1. A position and an attitude of the point $Q_0$, are stored. Subsequently, a state is established to wait the operator's jog key input (Step J2). Concurrently, it is periodically checked whether or not the coordinate system jog-feed mode is to be continued (Step J3). If it is confirmed in Step J3 that the coordinate system jog-feed mode is finished, the process is ended.

When the operator depresses the jog keys ($\beta+$, $\beta-$) to rotate the user coordinate system $\Sigma_1$ about the $Y_1+$ axis (or about the $Y_1-$ axis), the process proceeds from Step J2 to Step J4.

The jog-feed is carried out by repeating a predetermined fine displacement (here, a rotation displacement). Consequently, in Step J4, a moving target position and a target posture of the user coordinate system $\Sigma_1$ for the first fine displacement are calculated. A matrix showing the position and the attitude of the user coordinate system $\Sigma_1$ before the displacement is defined as (S), and the fine displacement matrix is defined as ($\Delta$). Accordingly, the moving (jog-feeding) target position of the user coordinate system $\Sigma_1$ can be expressed as ($\Delta$)·(S). Data defining ($\Delta$) can be found by a specified displacement direction (of $Y_1+$ or $Y_1-$) and a predetermined amount of fine displacement. In subsequent Step J5, setting data of the user coordinate system $\Sigma_1$ are updated depending upon the result of calculation in Step J4.

Upon the updated (i.e., finely jog-fed) user coordinate system $\Sigma_1$, a current position of the robot is different from the position data stored in Step J1 by the amount of fine displacement of the user coordinate system. Hence, in Step J6, in order to compensate for the deviation of the robot position data, the position data stored in Step J1 is read out, and the robot is moved to a target point on the (updated) user coordinate system $\Sigma_1$, which is specified by the position data.

The above processing cycle is finished, resulting in completion of a single process for the fine displacement. In subsequent Step J7, it is assured whether or not the jog-feed is to be continued. If Yes (for example, in case the same jog-feed key is kept depressed), the process returns to Step J4, and the process from Step J4 to Step J7 is repeated once again. A second or later process is carried out as in the first process.

The repetition of the fine displacement gradually jog-feeds the $X_1$ axis of the user coordinate system $\Sigma_1$ along a work surface. The jog-feed process can be observed by the robot rotated about the $Y_1$ axis. When the robot reaches a point $Q_1$ in FIG. 3, the operator once stops the coordinate system jog-feed (while holding the coordinate system jog-feed mode), and subsequently carries out rotary jog-feed about the $Z_1$ axis (Step S9).

The above process will now be described with reference to the flowchart of FIG. 5 once again. When the CPU 11 in the robot control device 10 confirms in Step J7 that the jog-feed about the $Y_1$ axis is stopped, a waiting state is established to repeat the process including Step J2 and Step J3. Further, when the operator depresses the jog-feed keys ($\gamma+$, $\gamma-$) to rotate the user coordinate system $\Sigma_1$ about the $Z_1+$ axis (or about the $Z_1-$ axis), the process proceeds from Step J2 to Step J4.

In Step J4, a moving target position and a target posture of the user coordinate system $\Sigma_1$ for the first displacement, are calculated. A matrix showing a position and an attitude of the user coordinate system $\Sigma_1$ before the displacement is defined as (S), and a fine displacement matrix is defined as ($\Delta$). Accordingly, the moving (jog-feed) target position of the user coordinate system $\Sigma_1$ can be expressed as (A)$\Delta$(S). Data defining ($\Delta$) can be found by a specified displacement direction (of $Z_1+$ or $Z_1-$) and a predetermined amount of fine displacement. In subsequent Step J5, setting data of the user coordinate system $\Sigma_1$ are updated depending upon the result of calculation in Step J4.

Upon the updated (i.e., finely jog-fed) user coordinate system $\Sigma_1$, a current position of the robot is different from the position data stored in Step J1 by the amount of fine displacement of the user coordinate system. Hence, in Step J6, in order to compensate for the deviation of the robot position data, the position data stored in Step J1 is read out, and the robot is moved to a target point on the (updated) user coordinate system $\Sigma_1$, which is specified by the position data.

The above processing cycle is finished, resulting in completion of a single process for the fine displacement. In subsequent Step J7, it is assured whether or not the jog-feed is to be continued. If Yes (for example, in case the same jog-feed key is kept depressed), the process returns to Step J4, and the process from Step J4 to Step J7 is repeated once again.

The repetition of the fine displacement enables a jog-feed operation in which the $X_1$ axis of the user coordinate system $\Sigma_1$ can be gradually brought closer to the edge line AB. The jog-feed process can be observed by rotational movement of the robot about the $Z_1$ axis. When the robot reaches a point $Q_2$ in FIG. 3, the operator stops the coordinate system jog-feed. During the operation, an amount of rotation $\theta_2$ of (the tool distal end point of) the robot about the $Z_1$ axis is identical with an amount of the rotary jog-feed of the $X_1$ axis.

As set forth above, in the process from Step S1 to Step S9 including the repeated process from Step J1 to Step J8, the position of the origin $O_1$, of the user coordinate system shifts much closer to the position of the vertex A of the workpiece W than at least the original position (see FIG. 2). Further, the respective $X_1$, $Y_1$, and $Z_1$ axes now substantially agree with the edge lines AB, AC, and DA. In Step S10, the state is defined as a corrective setting state of the user coordinate system $\Sigma_1$, and is stored in the robot control device 10 together with desired data (including coordinate system modifying historical data and so forth). Then, it can be regarded that the coordinate system jog-feed/corrective setting operation is completed.

If additional modification is required even in the above state, the operation from Step S1 to Step S9 may be carried out once again, thereby further improving the degree of conformity between the user coordinate system $\Sigma_1$ and the vertex A, the edge lines AB, AC, and DA.

The coordinate system itself is employed as the reference coordinate system during the coordinate system jog-feed operation in the embodiment. However, it must be noted that jog-feed in conformity to another coordinate system may be specified depending upon a workpiece form or a setting condition of the coordinate system.

As set forth above, according to the present invention, it is possible to ensure a function, like a manual operation function, to move the robot even in the user coordinate system. Accordingly, the user coordinate system can be set and finely controlled by a simple operation, that is, by the jog-feed operation for the translation and the rotation of the coordinate system itself. In addition, the jog-feed of the coordinate system can move the robot equivalently to the jog-feed steps. It is thereby possible to visually recognize originally invisible movement of the user coordinate system by observing the movement of the robot. It is also possible to optionally select a stationary position (the position and the attitude of the robot when the jog-feed of the coordinate system is started) of the robot on the user coordinate system. This is extremely effective in finding the optimal user coordinate system.

Even when the user coordinate system such as work coordinate system should be frequently modified, the robot control device of the present invention and the method of the present invention can be applied to accurately and rapidly modify and set the coordinate system without a skilled operator.

What is claimed is:

1. A method of manually feeding, by using a robot control device connected to a robot, a coordinate system set in the robot control device, comprising the steps of:

specifying a target coordinate system for the manual-feed;

selecting a reference coordinate system to manually feed the specified target coordinate system from among the specified target coordinate system itself and other coordinate systems set in the robot control device;

successively inputting the content of the manual-feed according to said reference coordinate system into the robot control device;

successively moving said specified target coordinate system in response to the content of the successive manual-feed; and successively causing said robot to move equivalently to the successive movement.

2. In an industrial robot, a method of manually feeding a coordinate system by moving and rotating a specified coordinate system itself by jog control to set and adjust the coordinate system, comprising the steps of:

specifying a coordinate system to be set and adjusted by a jog-feed operation;

setting a robot position at a starting point of the jog-feed at a specified point on the specified coordinate system to store data of the position;

carrying out the jog-feed operation to move said specified coordinate system;

when carrying out the jog-feed operation to move said specified coordinate system, controlling the robot to be moved according to the movement of said specified coordinate system;

finishing the jog-feed operation after it is confirmed that the robot is moved to reach a target point or area; and calculating for the setting and the adjusting of the specified coordinate system on the basis of the position data on said specified coordinate system, which is stored at the starting time of the jog-feed operation, and data of an amount of successive jog operation from the starting time of the jog-feed operation to a finishing time thereof.

3. A method of manually feeding, by using a robot control device connected to a robot, a coordinate system set in the robot control device by a jog-feed operation, comprising the steps of:

(a) setting a jog-feed mode to a mode in which a manual-feed target coordinate system is manually fed in conformity to the coordinate system itself or another coordinate system set in the robot control device;

(b) positioning a tool distal end point of the robot at the origin of the moving target coordinate system to store the position data in relation to another coordinate system set in the robot control device;

(c) successively carrying out translating jog-feed operation of said moving target coordinate system in each axial direction so as to cause the origin of said moving target coordinate system to agree with a specific vertex of a workpiece;

(d) for each successive translating jog-feed operation, causing the robot to move by an amount corresponding to the translating jog-feed operation;

(e) for each execution of the translating jog-feed operation, successively updating a position of said moving target coordinate system with respect to another coordinate system in step (b) depending upon an amount of the jog-feed inputted into the robot control device;

(f) successively carrying out the translating jog-feed operation, and finishing the translating jog-feed operation after it is confirmed that the tool distal end point of the robot finally reaches a target point such as a vertex of the workpiece;

(g) moving the tool distal end point of the robot to a point apart from the origin by a certain distance on specific one axis in axes of said moving target coordinate system at a time of step (f) after the completion of the translation feed in step (f), and storing the position data with respect to another coordinate system in step (b);

(h) successively carrying out rotary jog-feed operation about the axes of said moving target coordinate system so as to cause the specific one axis in step (g) to agree with a target area such as an edge line of the workpiece;

(i) for each successive rotary jog-feed operation, causing the robot to move by an amount corresponding to the rotational jog-feed;

(j) for each execution of the rotary jog-feed, successively updating a position of said moving target coordinate system with respect to another coordinate system in step (b) depending upon an amount of the jog-feed inputted into the robot control device; and (k) successively carrying out the rotary jog-feed operation, and finishing the rotary jog-feed operation after it is confirmed that the tool distal end point of the robot finally reaches a target area such as the edge line of the workpiece.

4. A robot control device comprising:

means for specifying a target coordinate system for manual-feed;

means for successively and manually inputting the content of the manual-feed according to a reference coordinate system for the manual-feed;

means for successively moving the target coordinate system for the manual-feed in response to the content of the successive manual-feed; and means for successively causing the robot to move equivalently to the successive movement.

* * * * *